United States Patent [19]

Anderson

[11] Patent Number: 4,985,793
[45] Date of Patent: Jan. 15, 1991

[54] VOICE COIL ACTIVATED DISK DRIVE PARKING DEVICE WITH MAGNETIC BIAS

[75] Inventor: Kurt M. Anderson, Louisville, Colo.

[73] Assignee: Conner Peripherals, Inc., San Jose, Calif.

[21] Appl. No.: 269,573

[22] Filed: Nov. 10, 1988

[51] Int. Cl.⁵ .............................................. G11B 5/54
[52] U.S. Cl. .................................. 360/105; 360/97.01
[58] Field of Search ............... 360/104, 105, 106, 75, 360/97.01, 78.12

[56] References Cited

U.S. PATENT DOCUMENTS

| | | | |
|---|---|---|---|
| 4,654,735 | 3/1987 | Izraelev et al. | 360/105 X |
| 4,672,487 | 6/1987 | Brand et al. | 360/97 |
| 4,677,509 | 6/1987 | Nishida et al. | 360/97 |
| 4,692,829 | 9/1987 | Campbell | 360/105 |
| 4,710,834 | 12/1987 | Brand et al. | 360/105 |
| 4,864,444 | 9/1989 | Liu et al. | 360/105 |

FOREIGN PATENT DOCUMENTS 0214481 10/1985 Japan .................................. 360/105

OTHER PUBLICATIONS

IBM Technical Disclosure Bulletin, vol. 19, No. 4, Sep. 1976, Actuator Retraction Device, Hearn p. 1440.

*Primary Examiner*—Robert S. Tupper
*Assistant Examiner*—Andrew L. Sniezek
*Attorney, Agent, or Firm*—Fliesler, Dubb, Meyer & Lovejoy

[57] ABSTRACT

A parking device for parking the actuator and the heads in a disk drive utilizes the magnetic field provided by the magnet in the actuator. A permeable latch return provided in the magnetic field creates an attractive force which biases the parking device to a latched position. A coil, provided on the parking device, passes an electric current in the magnetic field provided by the actuator to create a force which releases the parking device.

13 Claims, 5 Drawing Sheets

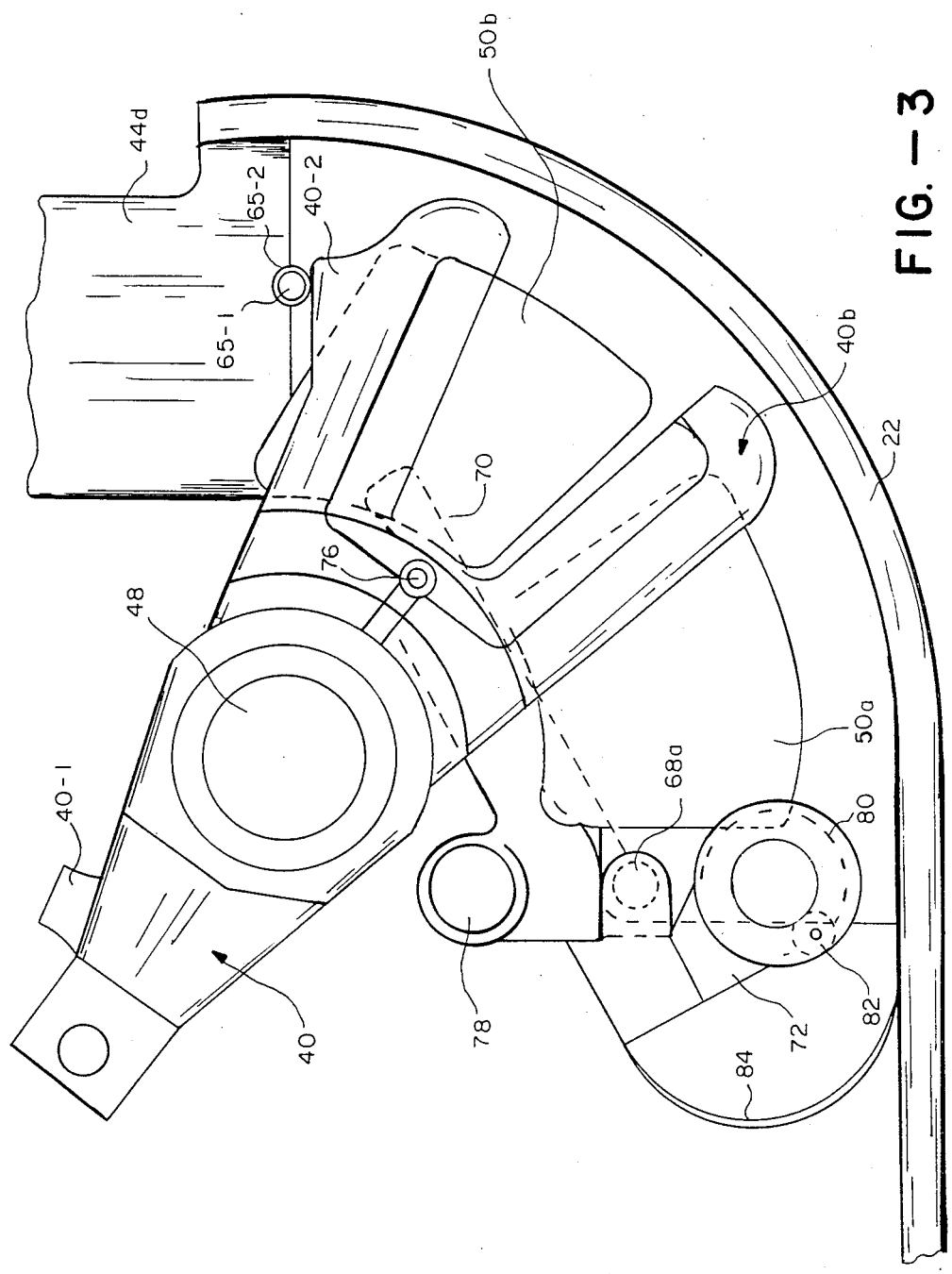

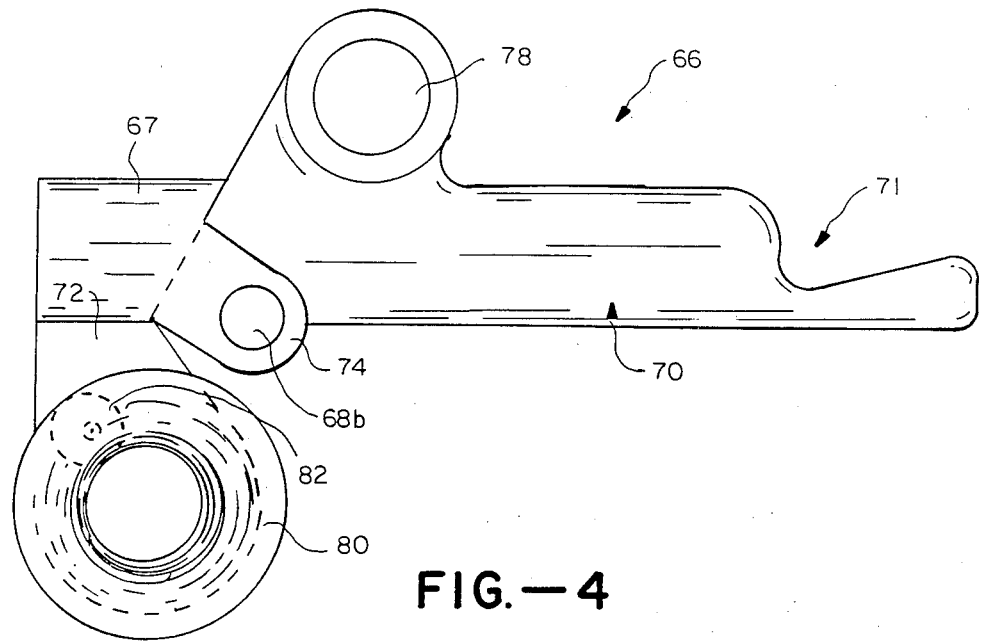
FIG.—4
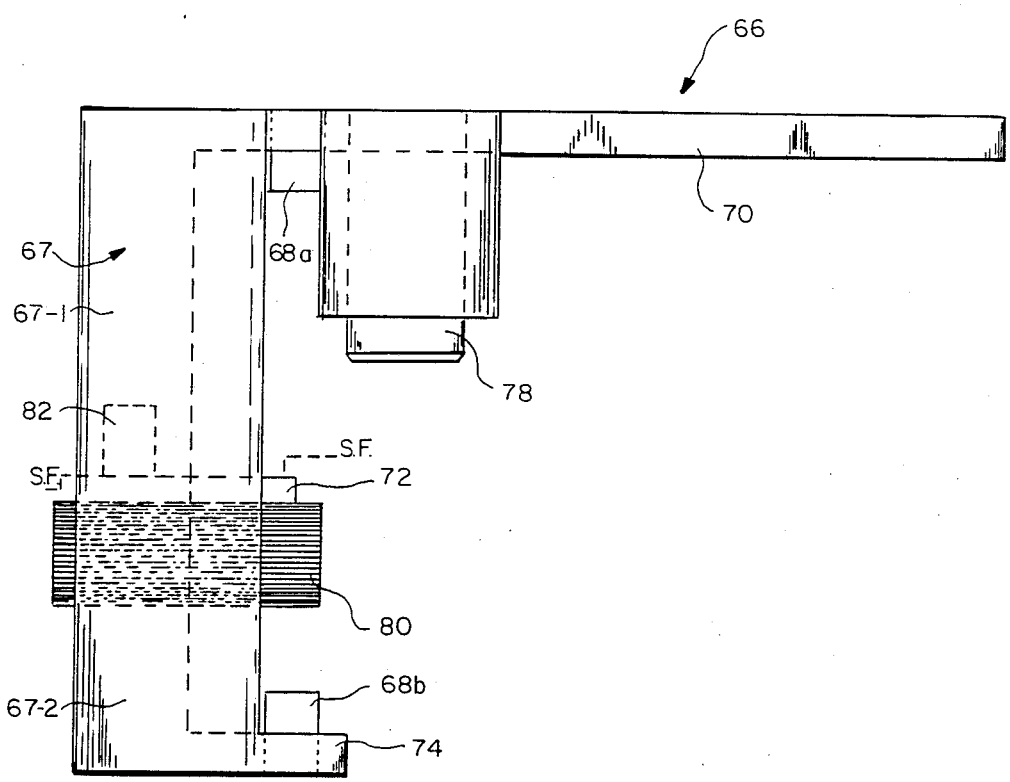
FIG.—5

VOICE COIL ACTIVATED DISK DRIVE PARKING DEVICE WITH MAGNETIC BIAS

BACKGROUND OF THE INVENTION

1. Field of the Invention

The present invention relates to parking devices for disk drives; more particularly, to devices which position and retain the head(s) of a disk drive over a selected portion of a hard (or fixed) disk when the disk drive is not in use.

2. Description of the Related Art

Conventional hard disk drives often incorporate a device for parking the head(s) of the drive. As used in this patent, the terms "park" and "parking" refer to maintaining the position of the head(s) over a selected portion (usually a "landing zone" at the inside or outside diameter) of the disk (or disks) by latching the actuator which supports the head(s). Many parking devices park the head(s) by physically engaging (latching) the actuator, and the terms "latched" and "unlatched" respectively refer to the engagement and disengagement of the parking device and the actuator.

In conventional disk drives, a head "flys" over the surface of a disk, riding on the stream of air created by the rotation of the disk. When the disk stops rotating, for example, when power is turned off, the head lands on the disk. If the head lands on a portion of the disk which is used to store data, there is a possibility that the disk, and thus the data stored on the disk, will be damaged. In addition, physical shocks experienced during shipping or other non-operational movements of a disk drive may cause the head to "slap" against the disk, Possibly causing a loss of data if the head slaps against a data-carrying portion of the disk. Parking the head assures that the head will land on the landing zone—i.e., a non-data storage portion of the disk—and will be held in a position over the landing zone during the power down period.

Various types of parking (or latching) devices have been used to look the actuator arm of a voice coil in a selected position when the disk drive is not operating. Many parking devices utilize a spring biased pivoting latch arm which holds the actuator in a parked position under the force of the spring when the disk drive is not in use and an electromagnet to release the latch during operation of the drive.

Air activated parking devices rely on the air flow generated by the rotating disks to release a spring biased latch arm. Other parking devices use a solenoid to release a latch arm.

In parking devices which utilize an electromagnet to attract a clapper plate, the clapper is at its farthest distance from the electromagnet when the head is parked, and the capture force necessary to release the latch is greatest when the head is parked. Accordingly, to ensure reliable latch release, the electromagnet must create a strong enough capture force to overcome the biasing force when the clapper plate is at its farthest distance from the electromagnet and the effect of the electromagnet on the clapper is at a minimum. Further, the spring or other means used to bias the latch arm to the latched position must provide a large enough biasing force to overcome any residual magnetism in the clapper, thereby increasing the required capture force.

To create a large enough force to release a latch arm, a solenoid must be relatively large. And, as with an electromagnet, the solenoid must develop the largest force at the beginning of its stroke—i.e., when the solenoid is least able to generate force. Air activated parking devices may pose the problem of interference with the air flow necessary for the heads to fly properly. Additionally, the air flow in a disk drive is only sufficient to create a relatively small release force, creating reliability problems for latch release. The lack of release force also means that the biasing force must be relatively small, thereby decreasing reliability of parking (latching).

Purely magnetic parking devices park the actuator by the attraction of and direct contact between a magnetically permeable portion of the actuator and a magnet. The primary drawback of a magnetic latch of this type is that during operation of the disk drive the rotational movement of the actuator is adversely affected by the attraction of the magnetically permeable portion of the actuator and the magnet, thereby creating problems with the track following and seek functions. Further, an extremely large force is required to release the actuator from the magnet.

SUMMARY OF THE INVENTION

It is, therefore, an object of the present invention to provide a parking device for a disk drive which magnetically biases the parking device to the latched position so that the parking device engages the actuator, and thus parks the head(s).

A further object of the present invention is to provide a parking device which utilizes a voice coil to create the forces required to release the latch.

Another object of the present invention is to provide a parking device which utilizes the magnetic field produced by the actuator motor to create the magnetic biasing force and the forces required to release the latch.

Another object of the present invention is to provide a parking device in which the magnetic biasing of the parking device does not create any external forces on the actuator during operation of the disk drive.

Another object of the present invention is to provide a parking device which provides the largest release force when the parking device is in the latched position.

Another object of the present invention is to provide a parking device which is low in power consumption.

Another object of the present invention is to provide a parking device which requires an minimum amount of space in the disk drive.

A parking device in accordance with the present invention, which is useful in a disk drive having a data storage medium, a transducer for reading information from and writing information to the data storage medium, and an actuator for selectively positioning the transducer with respect to the data storage medium, the actuator including a magnet for providing a magnetic field, comprises latch means, mounted in the disk drive to move between latched and unlatched positions, for selectively engaging and parking the actuator, a magnetically permeable latch return, provided on said latch means in the magnetic field provided by the magnet, for providing a biasing force to engage the latch means and the actuator, and coil means, provided on the latch means, for passing a current in the magnetic field provided by the magnet to create a force which disengages said latch means from said actuator.

BRIEF DESCRIPTION OF THE DRAWINGS

FIG. 3 is a partial plan view of a disk drive showing the actuator and a parking device in accordance with the present invention;

FIG. 4 is top view of a latch body of a parking device in accordance with the present invention;

FIG. 5 is a side view a latch body of a parking device in accordance with the present invention.

DESCRIPTION OF THE PREFERRED EMBODIMENTS

A disk drive including a parking device according to the present invention will be described with reference to FIGS. 1–6. The disk drive described herein includes, for example, four (4) disks with a magnetic coating and utilizes Winchester technology; however, the disk drive may utilize various numbers of disks (and a corresponding number of heads, usually one per disk surface—two (2) heads per disk) and other types of disks, for example, optical disks, and other read/write technologies, for example, lasers. The disk drive is constructed so that the head(s) are parked when the actuator is latched by a parking device.

Figure 1:
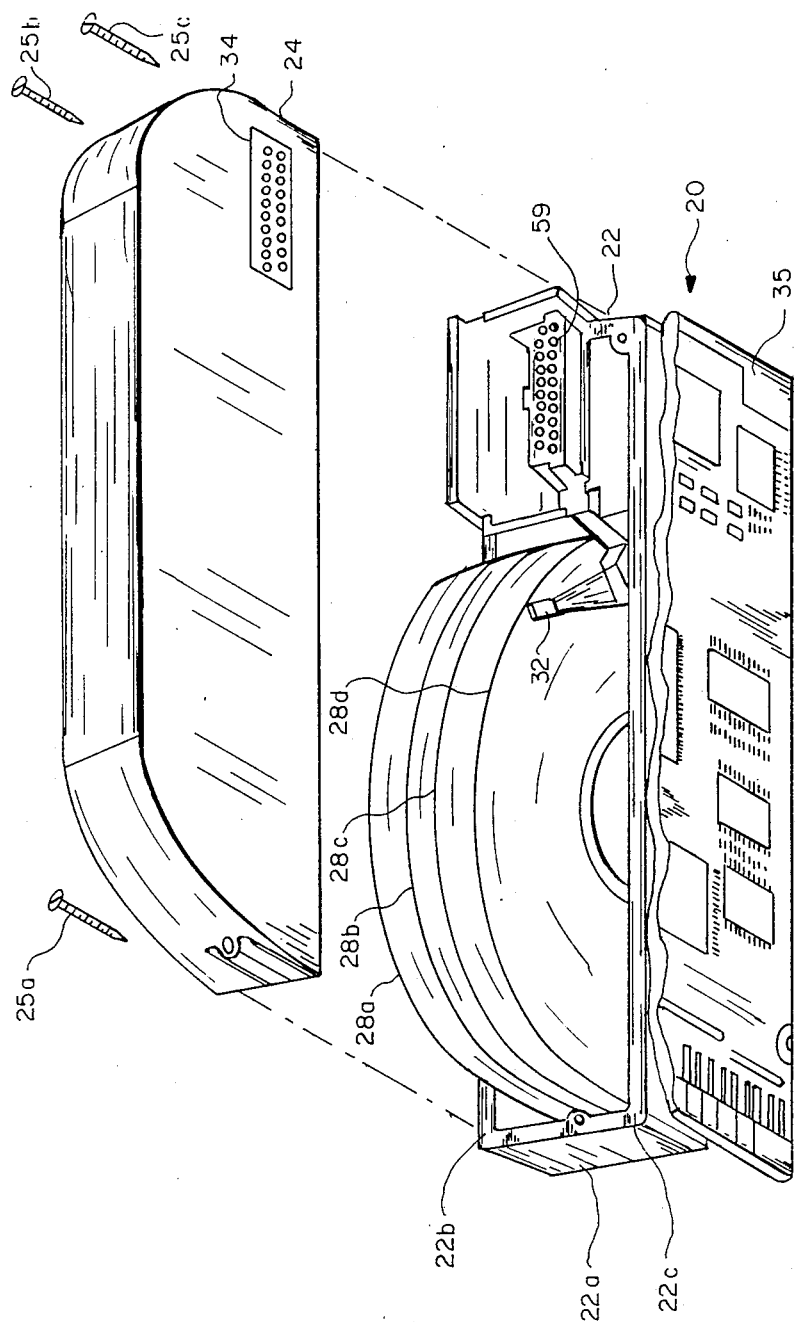
FIG. 1 is an isometric, partial cutaway view of a disk drive in accordance with the present invention.

A disk drive 20 including the magnetic parking device of the present invention will be described with reference to FIGS. 1–3. Disk drive 20 has a base 22 and a cover 24. Base 22 supports most of the internal components of the drive including a disk assembly 25 (having a spin motor 26 and disks 28a–d) and actuator assembly 30 for positioning head(s) 32 with respect to disk 28. A gasket (not shown) is provided between base 22 so that cover 24 is sealably attached to base 22 to provide a controlled environment between base plate 22 and cover 24, and cover 24 includes a header 34 for providing the transfer of all electrical signals between the controlled environment and a printed circuit assembly 35 attached to the base 22 and cover 24.

The disk drive 20 may have dimensions falling within the 3½" form factor. In the preferred embodiment of the 3½" form factor the dimension's are as follows: length 5.75"; width 4.00"; and height 1.625". Four disks 28a–d provide 200 Mb of memory using all eight surfaces for data storage with 1700 tracks per inch, 22,000 flux changes per inch, and 38 sectors per track. Embedded servo bursts provide closed-loop tracking as described in co-pending applications Ser. Nos. 057,806 and 058,289, assigned to the Assignee of the subject application, which are hereby incorporated by reference. The overall power consumption of the disk drive is less than 6 watts and the power consumption may be as low as 2 watts during idle periods. The parking device of the present invention draws less than 0.2 watts which contributes to the low overall power consumption.

The shell-like structure of base 22 provides the rigidity necessary to ensure that the heads 32 associated with the various disks 28a–d are all positioned over tracks which lie in the same cylinder. A cylinder is a vertically oriented segment representing the same track on the respective disks 38. Flexing of the structure supporting the heads 32, which are mounted on the actuator 30 at one location in the disk drive 20, and the disks 28, which are mounted on the motor 26 at another location in the disk drive 20, would cause tracking problems by moving different heads 32 by different amounts with respect to the respective disks 28. In addition, cover 24 is designed to provide a sealed environment for the disks without disturbing the structural rigidity of base 22. A three point mounting system is used to attach cover 24 to base 22, with screws 25a–c providing the sealing force.

Base 22 has a back wall 22a and first and second spaced, parallel side walls 22b, c, and spin motor 26 is supported between the first and second side walls 22b, c. Spin motor 26 comprises pre-loaded bearings (not shown) and thus the mounting of spin motor 26 to base 22 is not critical to the operation of the spin motor 26. Disks 28, which are rotated by spin motor 26, have selected inside and outside diameters 36 and 37 and a landing zone (or non-data area) 38 located, e.g., adjacent to the inside diameter 36. The landing zones 38 comprise any selected portion of the disks 28; however, a portion of the disk 28 adjacent to the inside or outside diameter 36, 37 is usually selected. In one embodiment of drive 20, inside diameter 36 is at a radius of approximately 0.98 inches and outside diameter 37 is at a radius of approximately 1.79 inches. Landing zone 38 extends from a diameter of approximately 0.86 inches to inside diameter 36.

The function of the actuator assembly 30 is to selectively position heads 32 with respect to the surfaces of disk(s) 28 by pivoting actuator arm assembly 40, more particularly, to position the heads 32 over individual tracks on disk(s) 28. Actuator assembly 30 is a rotary voice coil actuator including pivotable actuator arm 40, head(s) 32 mounted at a first end 40a of actuator arm 40, an actuator coil 42 mounted at a second end 40b of actuator arm 40 on the opposite side of the pivot point from the first end 40a of the actuator arm 40. Each head 32 is supported on actuator arm 40 by load beams 46 and flexures (not shown) provided between load beams 46 and each head 32. A bearing assembly 48 is inserted in actuator arm 40 and mounted between first and second walls 22b, c to provide the pivoting action of actuator arm 40. Actuator arm 40, including all of the components attached there&o, is precisely balanced, i.e., equal amounts of weight are provided on either side of the pivot point so that the positioning of head(s) 32 is less susceptible to linear shock and vibration.

Figure 6:
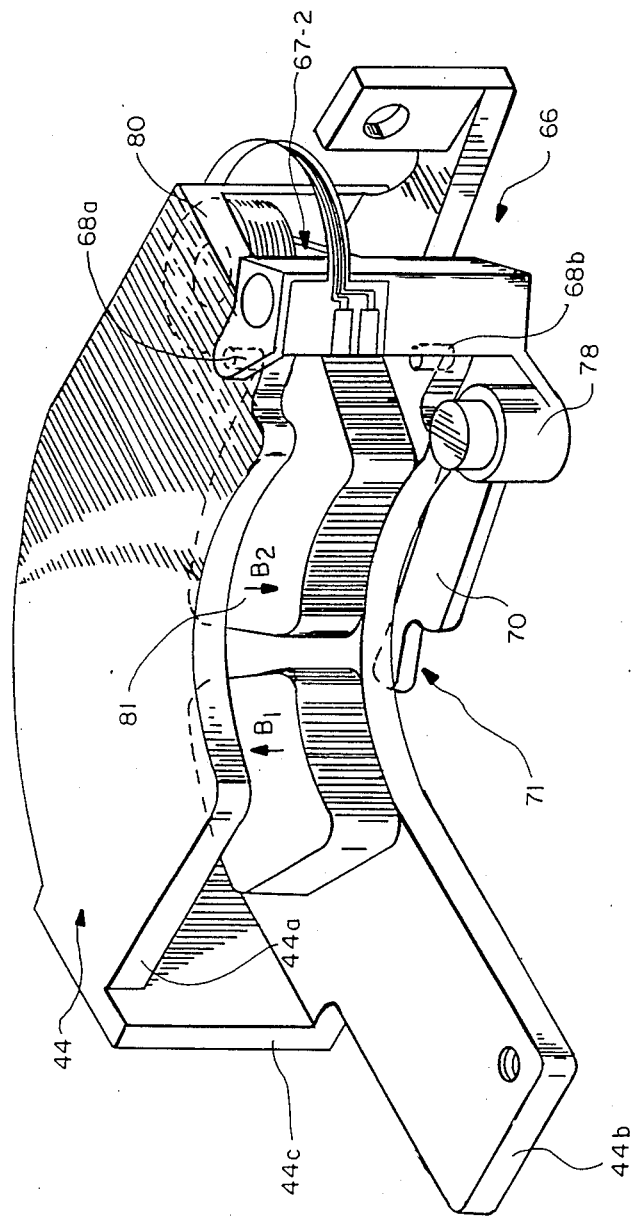
FIG. 6 is an isometric, partial cutaway view of a motor housing and a latch body of a parking device in accordance with the present invention.

An actuator motor housing 44 is formed of magnetically permeable material which has a "c" shaped cross section, as shown in FIG. 6. Motor housing <4 has top 44a and bottom 44b portions. As shown in the top view of FIGS. 2 and 3, the actuator motor housing is formed with an approximately 90° bend. Motor housing 44 is attached to base 22 by screws 57a, b. Actuator motor housing 44 is attached to back wall 22a and not to first and second walls 22b, c to avoid stresses or base 22 which could be caused by the different coefficients of thermal expansion of the steel motor housing 44 and the aluminum base 22.

Magnets 50a, b are supported by bottom portion 44b of motor housing 44, and top portion 44a, bottom portion 44b and back portion 44c of motor housing 44 provide returns for the magnetic fields generated by magnets 50 a, b. First and second magnets 50a, b have opposite poles attached to bottom portion 44b of motor housing 44 (e.g., the south pole of first magnet 50a and the north pole of second magnet 50b are attached to bottom portion 44b) to provide first and second magnetic fields $\vec{B}_1$, $\vec{B}_2$ in the air gap between respective ones of the first and second magnets 50a, b and top portion 44a. First and second magnetic fields $\vec{B}_1$, $\vec{B}_2$, are encompassed in closed magnetic field loops in motor housing 44. By containing the magnetic fields $\vec{B}_1$ and $\vec{B}_2$, in returns the magnetic field intensity of each field is increased in the region between the respective first and second magnets 50a, b and top portion 44a; the strength of the magnetic field in this region is directly related to the torque which the voice coil exerts on the actuator arm 40, and thus the rotational velocity of actuator arm 40 and the seek times for the drive.

The motor housing 44 and actuator coil 42 are arranged so that a current in coil 42, in the presence of the magnetic fields created by magnets 50 a, b, creates a force which pivots actuator arm 40. Currents passing in opposite directions in coil 42 create torques in opposite directions and pivot actuator arm 40 to position heads 32 at selected locations with respect to disk 28.

A read/write flex circuit 58 is connected to header 34 by a connector 59 and carries electrical signals from header 34 to actuator assembly 30. Connector 59 is mounted on the tail 44d of motor housing 44 by flex circuit bracket 60. Flex circuit bracket 60 includes a portion 60-1 which supports a portion of read/write flex circuit 58 to define the service loop of the read/write flex circuit 58. A spin motor flex circuit 62 carries electrical power from connector 59 to spin motor 26. Spin motor flex circuit 62 is attached to first wall 22b of base 22.

The service loop of read/write flex circuit 58 is designed to exert only a minimal amount of rotational force (torque) on actuator arm 40. Any torque exerted on actuator arm 40 by any means other than the voice coil portion of the actuator assembly 30 affects the function of actuator assembly 30 in positioning heads 32 with respect to disk 28, particularly the track following and seek functions described in co-pending applications, Ser. Nos. 057,806 and 058,289. Thus, any torques created by the voice coil assembly must be controlled to compensate for the force exerted by the read/write flex circuit 58.

Read/write flex circuit 58 may be separated into three portions; a first portion carrying current to actuator coil 42 and a second portion which is a ground plane separating the current carrying portion from a third data carrying portion. The data carrying portion provides signals to heads 32 for recording information on disk 28 and carries signals from the heads 32 to the printed circuit assembly 35, via header 34, when reading data from disk 28. The ground plane prevents interference with the relatively weak data signals which would otherwise be caused by the larger currents necessary for actuator coil 42 passing through the first portion of the read/write flex circuit 58.

Crash stops are provided to limit the pivoting movement of actuator arm 40 so that heads 32 travel only between the inside and outside diameters 36, 37 of disk 28. An outside diameter crash stop 64 is provided by a screw 64-1 provided in second wall 22c of base 22, and a compliant sleeve 64-2 formed of, for example, rubber or plastic provided on screw 64-1. When the pivoting motion of actuator arm 40 places heads 32 at the outside diameter 37 of disk 28, first crash tab 40-1 provided on actuator arm 40 contacts compliant sleeve 64-2 of the outside diameter crash stop 64, thereby preventing movement of the heads 32 beyond the outside diameter 37. Inside diameter crash stop 65 comprises a pin 65 provided on the bottom portion 44b of actuator motor housing 44, and a compliant sleeve 65-2 provided on pin 65-1. Inside diameter crash stop 65 contacts second crash tab 40-2 provided on actuator arm 40 to limit the movement of heads 32 beyond the inside diameter 36

A parking device 66 for parking the heads 32, i.e., latching the actuator arm 40 in an orientation where heads 32 are positioned, for example, at the inside diameter 36 of disk 28, will be described with reference to FIGS. 2-6. Parking device 66 moves between a latched position, in which parking device 66 engages and latches actuator arm 40, and an unlatched position, in which the parking device 66 is clear of the portion of the actuator arm 40 which the parking device engages. FIG. 2 shows parking device 66 in the unlatched position and FIG. 3 shows parking device 66 in the latched position, engaged with actuator arm 40. In the preferred embodiment of the present invention, the parking device is pivotally mounted in the disk drive to rotate between the latched and unlatched positions. However, in an alternative embodiment a parking device may be mounted to move linearly between the latched and unlatched positions using biasing and release forces provided in accordance with the present invention.

Parking device 66 includes a latch body 67, pivotally mounted in the disk drive 20, for example, by pins 68a, b which engage motor housing 44. Latch body is formed in two portions 67-1 and 67-2, which join at line SF-SF (FIG. 5) with a snap fit, to allow latch body to be assembled over and pins 68a, b to engage motor housing 44. Three arms 70, 72, 74 extend from latch body 67. Latch arm 70 has a notch 71 which engages a latch pin 76 on actuator arm 40 and supports a counterweight 78 which balances the latch body 67 and the various components attached thereto about its pivot points Latch arm 70 also supports pin 68a. Second arm 72 supports a latch coil 80 and a latch return (or latch bias) 82 which comprises a magnetically permeable element. Third arm 74 supports pin 68b. Latch body 67, including all of the components attached thereto, is precisely balanced about the pivot points provided by pins 68a, b so that the operation of parking device 66 is less susceptible to linear shook and vibrator., and so that minimum amounts of force, and thus a minimum of electrical current in coil 80, are required to pivot the latch body 67.

A latch flex circuit 84 carries current to coil 80 from connector 59. The forces provided by latch coil 80 and latch return 82 must be adjusted to compensate for the rotational resistance (torque) created by frictional forces and latch flex circuit 84.

A biasing force, which affects only latch body 67, is provided by the attraction of latch return 82 to permanent magnet 50a. This biasing force rotates latch body 67 so that latch arm 70 engages latch pin 76 to park actuator arm 40. Passing a current is the appropriate direction in coil 80, which is positioned in the magnetic field of magnet 50a, creates a force which the latch coil 80 from magnet 50a and rotates latch body 67 so that latch arm 70 swings away from latch pin 76.

When power to the disk drive 20 is off, the actuator arm 40 is positioned so that second crash tab 40-2 abuts pin 65 and latch arm 70 engages latch pin 76 Any rotation of actuator arm 40 away from crash stop 65 creates a torque which maintains the latch body 67 in the latched position; as shown in FIG. 3, the moment arm of the force created by rotational movement of actuator arm 40 passes on the side of the pivot provided by pins 68a, b closest to disks 28. Accordingly, parking device 66 reliably maintains the actuator arm 40 in the latched position.

Figure 2:
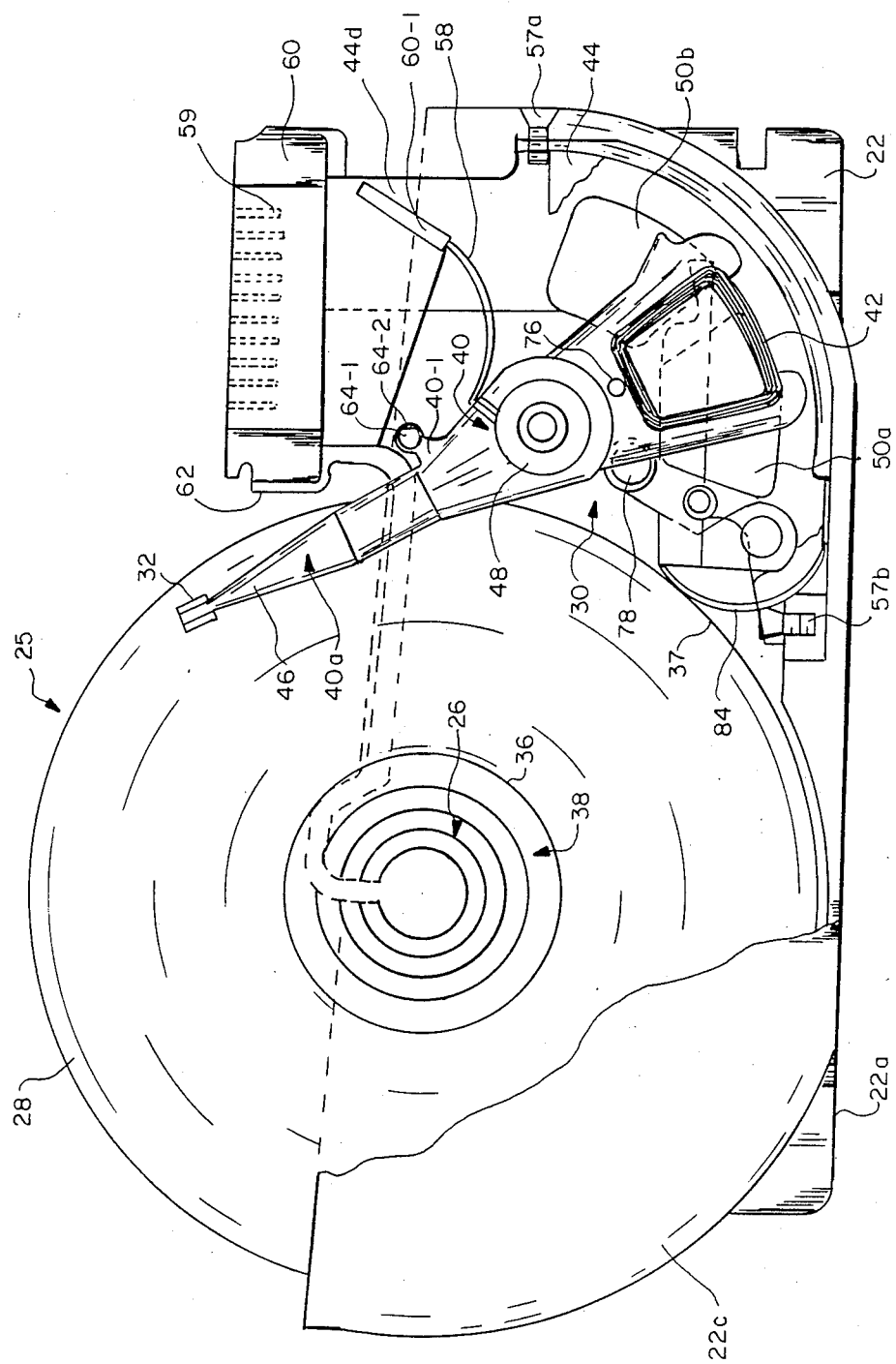
FIG. 2 is a partial cutaway, plan view of a disk drive including a parking device in accordance with the present invention.

As power is provided to the disk drive, a current in latch coil 80 swings latch body to the position shown in FIG. 2, allowing actuator arm 40 to swing freely without having latch pin 76 contact latch arm 70.

The process for latching actuator arm during power-down is as follows. During power-down of the disk drive 20, the control means provided by the circuitry on printed circuit 35 causes actuator assembly 30 to pivot the actuator arm 40 to the position where the heads 32 are over the landing zone 38 of disk 28 before the rotational speed of the disk 28 is decreased &o the point where the heads 32 land on the disk 28. Then, power to coil 80 is discontinued and the biasing force provided by latch return 82 rotates the latch body 67 so that latch arm 70 engages latch pin 76 to park the heads 32.

In the preferred embodiment, a portion of latch coil 80 is provided in gap 81 between magnet 50a and the top portion 44a of motor housing 44 when the actuator arm 40 is parked. This orientation provides the maximum release force when the parking device 66 is in the latched position, and thus assures reliability in disengaging latch arm 70 and actuator pin 76 and overcoming the biasing force created by latch return 82. A simplified analysis of the forces created by the current flowing in various portions of coil 80 can be performed by assuming that the current in coil 80 only travels in four directions, as if the coil had a square shape. The forces created by the current flowing towards and away from the magnet 50a are equal and opposite, and thus cancel each other. However, the current flowing in the portion of the coil closest to the magnet and in the portion of the coil farthest from the magnet are opposite but unequal The current passing in the portion of coil 80 farthest from magnet 50a creates a force which is of much smaller magnitude than the force created by the current passing in the portion of coil 80 closest to magnet 50a. The release force must overcome this opposite force when combined with the forces of latch return 82, latch flex circuit 84, and the friction between latch arm 70 and latch pin Many factors control the biasing and release forces. The biasing force is effected by the size of the latch return 82 and the distance of the latch return from magnet 50a. The release force is controlled by factors including the number of turns in coil 80, the distance of the coil 80 from magnet 50a, and the current in coil 80. To properly balance the biasing and release forces all of these factors must be considered. The inventor has empirically determined the relative distances of the coil 80 and the latch return 82 from magnet 50a as well as the size of the latch return 82 and the number of turns in coil 80, based on the smallest current which provides a reliable release force.

The use of coil 80 provides a low power parking device which is highly reliable, and since the coil is not used to attract a magnetically permeable element, there is no residual magnetism. Latch return 82 provides a reliable return force without reliance on the interactions of mechanical elements in the disk drive.

The many features and advantages of the disk drive of the present invention will be apparent to those skilled in the art from the Description of the Preferred Embodiments. Thus, the following claims are intended to cover all modifications and equivalents falling within the scope of the invention.

What is claimed is:

1. A parking device for a disk drive having a data storage medium, a transducer for reading information from and writing information to the data storage medium, and an actuator for selectively positioning the transducer with respect to the data storage medium, the actuator including a magnet for providing a magnetic field and an actuator coil mounted on the actuator arranged so that a current in said coil creates a force to pivot said actuator, comprising:

latch means, mounted in the disk drive to move between latched and unlatched positions, for engaging and parking the actuator when said latch means is in the latched position;

a magnetically permeable latch return, provided on said latch means in the magnetic field provided by the magnet, for providing a biasing force to move said latch means to the latched positions; and coil means, provided on the latch means, arranged so that a current in said coil means, in the magnetic field provided by the magnet, creates a release force of opposite direction with respect to said biasing force which moves said latch means to the unlatched position.

2. A parking device according to claim 1, further comprising a counterweight provided on said latch means, wherein:

said latch means is pivotally mounted in the disk drive; and said latch means is balanced about the pivotal mounting.

3. A parking device according to claim 2, wherein said latch means comprises:

a latch body;

a first arm, provided on said latch body, for engaging the actuator and supporting said counterweight, and a second arm, provided on said latch body, for supporting said latch return and said coil means.

4. A parking device according to claim 1, wherein:

the disk drive has a magnetically permeable housing for providing a return for the magnetic field an air gap provided between the magnet and a portion of the magnetically permeable housing and said coil means passes a current in the air gap between the magnet and the magnetically permeable housing when said latch means is in the latched position to create the release force.

5. A parking device according to claim 4, wherein said latch return is outside of the air gap when the actuator is parked.

6. A disk drive having a base, comprising:

a data storage medium supported by the base;

transducer means for reading information from said writing information to said data storage medium;

actuator means, supported by the base, for selectively positioning said transducer with respect to said data storage medium, including an actuator arm pivotally mounted on the base having a first end for supporting said transducer means and a second end;

a magnet for providing a magnetic field, a motor housing for supporting said magnet and for providing a return for the magnetic field, and an actuator coil, provided on the second end of said actuator arm, arranged so that a current in said actuator coil in the magnetic field provided by said magnet, creates a force to pivot said actuator arm; and parking means for selectively parking said actuator arm and said transducer means, including
- a latch body, pivotally mounted on said motor housing, for engaging said actuator arm,
- a latch return provided on a portion of said latch body in the presence of the magnetic field provided by said magnet for magnetically biasing said latch body to engage said actuator arm, and
- a latch coil, provided on said latch body, arranged so that a current in said latch coil in the magnetic field creates a force to release said latch body from said actuator arm.

7. A disk drive according to claim 6, further comprising a latch pin provided on the second end of said actuator arm, said latch body engaging said latch pin.

8. A disk drive according to claim 7, further comprising a counterweight provided on said latch body for balancing said latch body about a pivot point.

9. A disk drive according to claim 8, wherein said latch body comprises a first arm for engaging said actuator and supporting said counterweight, and a second arm for supporting said latch return and said latch coil.

10. A disk drive, comprising:
- a base, having an end wall and first and second spaced apart, substantially parallel side walls, and a cover;
- a spin motor supported by said first and second side walls of said base;
- a plurality of disks mounted on said spin motor, each said disk having a landing zone;
- transducer means for reading information from and writing information on said disk;
- an actuator arm pivotally supported on said base about a support point, said actuator arm having a first end for supporting said transducer means and a second end disposed on the opposite side of said support point from said first end;
- an actuator motor, comprising:
- magnetic means for providing a magnetic field;
- a C-shaped motor housing formed of magnetically permeable material, for supporting said magnetic means and for providing a return for the magnetic field, and
- a first coil, supported by said second end of said actuator arm and lying in a plane substantially parallel to said disk, arranged so that a current in said first coil, in the presence of the magnetic field provided by said magnetic means, creates a force to pivot said actuator means;
- magnetically biased parking means for parking said actuator arm, comprising:
- a latch, pivotally mounted in the disk drive, for selectively engaging and parking the actuator,
- a magnetically permeable latch return, provided on said latch in the presence of the magnetic field provided by the magnetic for biasing said latch to engage the actuator, and
- a second coil, provided on the latch, arranged so that a current in said second coil, in the presence of the magnetic field provided by the magnetic creates a force which disengages said latch from said actuator.

11. A parking device for a disk drive having a data storage medium, a transducer for reading information from and writing information to the data storage medium, and a rotary voice coil actuator, including a magnet for providing a magnetic field, for selectively positioning the transducer with respect to the data storage medium, comprising:
- a latch body, pivotally mounted in the disk drive to rotate between latched and unlatched positions;
- a first arm provided on said latch body for engaging the actuator when said latch body is in the latched position;
- a second arm provide dons aid latch body;
- a magnetically permeable latch return, provided on said second arm in the magnetic field provided by the magnet, for providing a biasing force to rotate said latch body to the latched position; and
- a coil, provided on said second arm, arranged so that a current in said coil in the magnetic field provided by the magnet creates a release force which rotates said latch body to the unlatched position.

12. A parking device according to claim 11, further comprising a counterweight provided on said first arm for balancing said latch body about a pivot point.

13. A parking device according to claim 12, wherein: the disk drive has a magnetically permeable housing for providing a return for the magnetic field and an air gap is provided between the magnet and a portion of the magnetically permeable housing; and said coil passes a current in the air gap between the magnet and the magnetically permeable housing when said latch body is in the latched position to create the release force.

* * * * *